Nov. 29, 1966   W. P. LEAR, SR   3,288,983
ELECTRICAL RESISTANCE DE-ICING MEANS FOR
AIRCRAFT WINDSHIELDS
Filed July 29, 1963

United States Patent Office 3,288,983
Patented Nov. 29, 1966

3,288,983
ELECTRICAL RESISTANCE DE-ICING MEANS FOR AIRCRAFT WINDSHIELDS
William P. Lear, Sr., Wichita, Kans., assignor to Lear Jet Corporation, Wichita, Kans., a corporation of Delaware
Filed July 29, 1963, Ser. No. 298,318
1 Claim. (Cl. 219—522)

This invention relates to de-icing and more particularly to the melting of ice and the prevention of the formation of ice, especially on aircraft. More specifically, this invention relates to systems for de-icing airfoil surfaces of aircraft, and in particular to systems for de-icing the windshield and windows thereof. Still more specifically, this invention relates to electrical resistance de-icing apparatus and combinations thereof which embody a thin layer of material having a thin electrically conductive film, and a means to pass current therethrough. Another aspect of this invention relates to a de-icing apparatus, particularly for use on an aircraft, that is adapted to provide a temperature gradient. Another aspect of this invention relates to methods for producing the de-icing apparatus and combinations thereof, which methods are simple, easy, and inexpensive in use.

De-icing systems are very important in aircraft particularly large commercial planes and military planes that must fly in all types of weather and/or encounter all types of weather in normal operation. One type of de-icing apparatus that is commonly used on wing surfaces and other airfoil surfaces of aircraft where ice is likely to form consists of flexible inflatable protective coverings. These coverings are continuously inflated and deflated in use to break away any ice that may form thereon. This type of de-icer is, however, relatively heavy, expensive, and a permanent installation which is, in general, used on commercial and larger and more expensive aircraft. Also, it is difficult to install on planes not originally equipped since installation is a major modification. The installation of this type of de-icer on airfoil surfaces of a plane not originally equipped involves a major installation including provision of a pump to activate the de-icer, tubing leading from the pump to the protective coverings, control valves, etc. Further, it is entirely unsuited for de-icing windshields or windows of an aircraft.

Electrical heat de-icing means are also used on aircraft airfoil surfaces. This type of de-icing means, in general, embodies complex electrical heating resistance elements each having, in general, a high resistance layer of metal insulated and mounted in an envelope structure. The electrical resistance de-icing means known to the prior art are relatively expensive and are difficult to mount on an airfoil surface. Further, they have a complex terminal arrangement for conducting current to the layer and often do not efficiently apply the heat to the desired area. These de-icers can be used only on airfoil surfaces and not on windows, windshields, etc. since they are opaque.

Windshield and window de-icing means are known in the art. These de-icing means have, in general, an electrical resistance heating element laminated between layers of glass. This de-icing means is a permanent installation and is relatively expensive and heavy. It cannot be conveniently or inexpensively installed on a plane or vehicle not originaly equipped with same.

In general, there is an existing need for a simple, relatively inexpensive de-icing system that can be easily and simply installed on airfoil surfaces, windshields, windows and the like of aircraft and other craft. Further, there is a need for a de-icing apparatus that is inexpensive and can be simply installed that will provide a temperature gradient over the surface of same to enable the selective application of larger amounts of heat on various sections to meet and defeat the tendency for ice to build up on localized areas.

I have invented a de-icing apparatus having a heating element. The heating element is a backing material having an electrically conductive layer thereon, and terminal means in electrical contact with the layer adapted to pass electrical current through the layer. My de-icing apparatus is particularly adapted for mounting on the windshield or window of an aircraft, vehicle, and the like. When the de-icing apparatus is used on a windshield or window, the backing material is preferably a sheet of transparent material, and the electrical conductive coating is thin and of a thickness to provide relatively unimpaired vision therethrough. The coating is preferably a very thin metallic coating of gold, silver, copper, aluminum, or the like, or mixtures thereof. The de-icing apparatus combination of my invention preferably includes the aforementioned de-icing apparatus heating element, a means constructed and adapted to pass an electrical current through the electrically conductive layer, and a means to secure the sheet on a surface, preferably an airfoil surface, windshield, or window of an aircraft or other craft, and vehicles. The de-icing apparatus and apparatus combination of my invention are adapted in use to melt and prevent ice from forming on a surface covered by the heating element.

The method of my invention of producing a de-icing system includes the steps of applying an electrically conductive layer to a material, provide spaced electrical terminal means in electrical contact with the electrically conductive layer, and secure the material to a surface. In use the terminal means are connected to a suitable source of electrical current. In preferred specific embodiments, the electrically conductive layer is a very thin layer of gold, silver, copper, aluminum, or the like, applied preferably by high vacuum deposition. The layer which can consist of a uniform coating, or a series of spaced parallel metal conductor lines, is of a thickness and/or design adapted to permit maximum transmission of light therethrough. My method of producing a de-icing apparatus can be applied to either a windshield, window, airfoil surface, or other surface of an aircraft or other craft, as for example, rockets, space capsules, etc. The source of power used is alternating or direct current of a suitable voltage depending on the resistance of the metallic film and the heat desired.

The de-icing apparatus and method of producing same of my invention solves the problems associated with de-icing apparatus, and methods of producing same known to the prior art. My new de-icer apparatus is relatively inexpensive and can simply and readily be installed on practically any shape of airfoil surface, windshield, window, or the like. Electrical leads consisting of small wires can be readily installed in the structure of the aircraft, or the like, in contrast to the aforementioned fluid or pneumatic conduits and tubing used with inflatable type de-icers. The de-icing apparatus of my invention is very light in weight and, therefore, does not materially increase the weight of the aircraft or cause an objectional weight re-distribution. The de-icing apparatus of my invention also provides the surface of the aircraft with an abrasion resistant surface. In the event that the heating element of my apparatus is damaged, it can very readily be replaced with another. The heating element is sufficiently thin that it does not alter the aerodynamic characteristics of the aircraft or airfoil surfaces thereof. Also, in many instances, the surface of the aircraft is rendered more smooth and less susceptible to friction of moving air thereover. This effect enhances the performance of aircraft, in contrast to many de-icing apparatus known to the prior art which achieves the opposite effect of increasing the friction between the surface and the air stream. In my de-icing apparatus the heat is applied directly to the location or surface where the ice has a tendency to form. It is not necessarily to expend power and energy to unnecessarily heat associated wing structure, airfoil structure, and windshield and window structure. This reduces the weight of the power or activating means supplying the energy for the de-icing system, which is very desirable in regard to aircraft.

The method of producing a de-icing apparatus of my invention is simple, inexpensive, and easy to use. Relatively unskilled personnel can produce and install the de-icing means using my method of producing same.

The de-icing means of my invention when used on windshields or windows is such that the optical qualities of the windshield or window are not unduly interfered with. The thickness of the conducting metal film is such as to reduce the light transmission by a minimal amount. Properly applied, the thickness of the adhesive is too small to cause optical distortion.

It is an object of this invention to provide a new de-icing system.

It is another object of this invention to provide new methods of producing de-icing system.

It is yet another object of this invention to provide a de-icing apparatus that is light in weight.

Yet another object of this invention is to provide a de-icing apparatus that is inexpensive, efficient, and can be easily and simply installed.

Another object of this invention is to provide a de-icing apparatus that does not alter the shape of an airfoil surface to which it is applied to thereby alter its aerodynamic characteristics.

Another object of this invention is to provide a de-icing means that efficiently applies heat to the location that icing is likely to occur without unduly heating the supporting surface thereof.

It is an object of this invention to provide a de-icing apparatus adapted to provide a temperature gradient over the surface thereof.

Another object of this invention is to provide a de-icing apparatus particularly adapted for use on windshields and windows of an aircraft which will not unduly interfere with the optical characteristics of the window and windshield.

It is another object of this invention to provide new de-icing apparatus combinations.

Another object of this invention is to provide a new method of producing de-icing systems which are inexpensive and can be simply and easily installed.

Yet another object of this invention is to provide a method of producing de-icing apparatus on aircraft and the like which can be simply and conveniently built up to provide any desirable type of temperature gradient.

Another object of this invention is to provide a novel method of producing a de-icing apparatus in which a thin transparent electrically conductive coating is vapor-deposited on a relatively thin flexible transparent plastic sheet.

Other objects and advantages of the invention will be apparent to those skilled in the art from the disclosures set forth herein. Drawings of preferred specific embodiments of the invention accompany and are a part hereof, and such are not to unduly limit the scope of the invention. In the drawings, FIG. 1 is an enlarged fragmentary cross sectional view of a section of the new de-icing apparatus of my invention.

Figure 1:
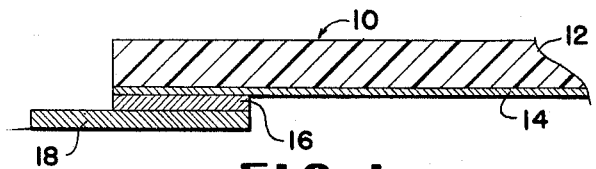

The following is a discussion and description of the new de-icing apparatus and combinations thereof, and the new method of producing de-icing apparatus and combination thereof of my invention made with reference to the drawings, whereon the same reference numerals are used to indicate the same or similar parts and/or structure. The discussion and descriptions are of preferred specific embodiments of the new de-icing apparatus and combinations thereof and method of producing same of my invention and it is understood that such are not to unduly limit the scope of my invention.

Referring now to FIGS. 1 through 6 of the drawings, and FIG. 1 in particular, there is shown de-icing means 10 having a thin electrical resistance heating element 14 deposited on a thin transparent backing sheet 12 of polytetrafluoroethylene, Mylar, or other material. The thickness of the plastic sheet 12 can be of any suitable thickness, preferably in the range of from 1 to 10 mils, but not limited to that range. The relative thicknesses of the component elements are not necessarily accurately depicted in FIG. 1. The sheet 12 can be of any suitable material but when used as a de-icing apparatus on windshields and/or windows it is desirably transparent. The material used is preferably a plastic material, more preferably a transparent flexible plastic such as Teflon (polytetrafluoroethylene), Kel-F (polytrifluorochloroethylene), a polyester film product resulting from the condensation reaction between ethylene glycol and terephthalic acid sold under the trademark "Mylar," polymethymethacrylate, polyvinylchloride, mixtures of the foregoing plastics, etc. Any suitable plastic can be used for backing sheet 12. When the de-icer 10 is used on an airfoil surface where transmission of light therethrough is not a consideration, the types of and classes of plastics and other materials which can be used are greatly enlarged. The most preferred plastics for use in sheet 12 are Teflon (polytetrafluoroethylene) and a polyester film product sold under the trademark "Mylar."

On sheet 12 is disposed a thin uniform metallic coating or film of metal 14. The coating is of an electrically conductive material, most preferably a metal such as gold, aluminum, silver, copper, a nickel alloy composed of 80% nickel, 14% chromium and 6% iron sold under the trademark of "Inconel," and a nickel chromium alloy having 60% nickel, 12% chromium, 2% manganese, and 26% iron sold under the trademark of "Nichrome." However, any suitable type of electrically conductive material 14 is preferably put on in a very thin layer, particularly when used as a de-icing means on windshields or windows. The coating or film 14 is preferably deposited on sheet 12 by vapor depositing in a vacuum. The coating 14 is deposited preferably by introducing the sheet 12 into a vacuum chamber, vaporizing the desired metal, and causing the vaporized metal to be deposited on the surface of the sheet. The thickness of layer or film 14 can be of any suitable thickness but more preferably is of a thickness adapted to allow approximately 70% to 90% transmission of light therethrough, and most preferably, is of a thickness to allow approximately 85% transmission of light therethrough. The thickness of film or layer 14 is governed in part by the type of material it is composed of. Since the thickness of the film 14 is very small when the proper light transmission is obtained, that is in the order of several times the diameter of the molecule, of the metal, the electrical resistance is relatively high. Hence, it is desirable to use metals having a low resistivity, such as silver, gold and copper. When the de-icer apparatus is used on an airfoil surface the film can be thicker to provide a lower electrical resistance. Relatively thick elongated coating portions of metal 16 are disposed on the opposed side portions of plastic sheet 12 in overlying relationship and in electrical contact with the thin transparent metallic coating 14. Portions 16 are also made of electrically conductive material, preferably the same type of material used in coating 14, and provide a means for uniformly passing an electrical current across film 14. Electrical terminals 18 are provided on each of the relatively thick coated portions 16 which, in practice, can be thin metal foil, or any other suitable type of terminal. Other means can be used instead of coating portions 16 as for example, such as metal strips secured to the edge portions of 12. A thin layer of adhesive is used to secure the heating element 14 to the exterior surface of the airfoil surface, windshield, or window of an aircraft with the thin transparent coating positioned immediately adjacent the exterior of the surface and underlying the plastic sheet 12. Any suitable type of adhesive can be used to secure the heating element 14 to the surface of the aircraft. However, I have found that an epoxy adhesive comprised of a composition of matter of a polymeric polyepoxide having an epoxide equivalency greater than one combined with a curing agent for epoxies works very well. I have found that very satisfactory and preferred epoxy resins for the adhesive can be described as partially polymerized diglycidyl ethers of Bisphenol A, and preferably, they have polymer molecular weights in the range of 350 to 4,000. Typical preferred diglycidyl ethers are prepared from the reaction of Bisphenol A and epichlorohydrin, dichlorohydrin, butadiene dioxide and the like. They can be, and are preferably prepared by the methods set forth in Epoxy Resins, Lee and Neville, McGraw-Hill, 1957.

Preferred adhesives to be used in the practice of the invention contain a thermosetting resin component in addition to the epoxy resin or resins therein. These preferred thermosetting resins comprise an aldehyde reacted with a compound selected from the group consisting of phenols, resorcinols, and mixtures thereof, and preferably, they are phenol-formaldehyde resins, usually referred to as phenolic resins, and preferably, in the condition referred to as the A stage (that is, only partially polymerized). They have been described as linear polymers possessing fewer than six phenolic nuclei with methylol groups in the reactive positions in presence of an excess of formaldehyde.

A filler, or fillers, can be added to the adhesives, and in most instances, this is desirable. It is preferred to use finely ground inorganic materials such as silicates, carbonates, silica, mixtures of these, and the like. Kind and amount of the resins and additives are used to produce a light transparent adhesive.

The adhesives preferably have curing agents for the resins incorporated therein. Their use results in faster cures, and in some instances, stronger bonds. Preferred curing agents are aliphatic amines, aromatic amines, amides, organic acids, acid anhydrides, mixtures of these, and the like.

Figure 6:
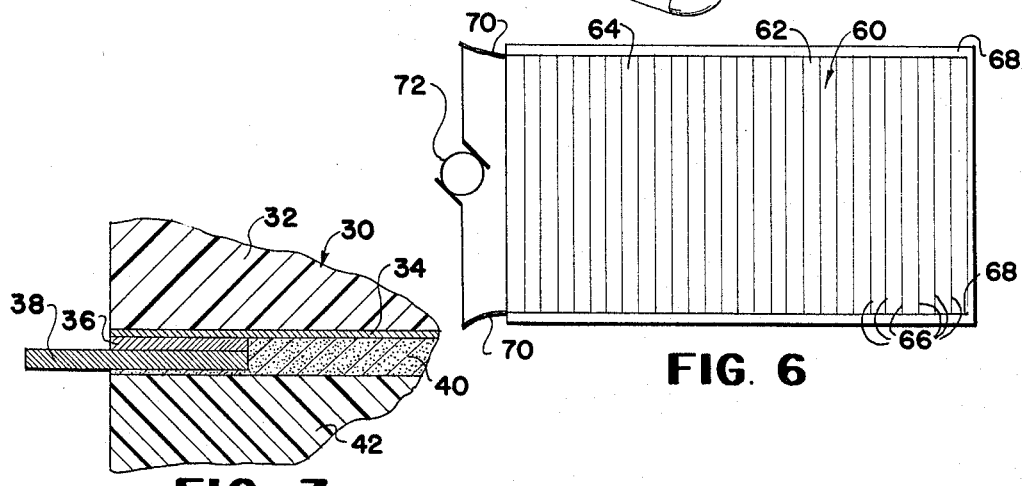
FIG. 6 is a front view of still another embodiment of my de-icing apparatus particularly adapted for use on windshields and windows of aircraft.

Properly applied, the thickness of the adhesive or cement is too small to cause optical distortion. The heating element 14 can be adhered directly to the surface of a windshield or window or to any suitable surface of an aircraft made of non-conductive material. When the surface of the aircraft is of an electrically-conductive material, a coating or means is provided to insulate the electrically-conductive film or layer 14 from the surface. The heating element 14 of de-icer 10 of my invention preferably has thickened coating portion 16 disposed along the parallel edge surface portions of the sheet 12. The arrangement of the thickened portions and terminals is generally shown in FIG. 6. However, thickened coating portions 16 can be disposed intermediate the edge surfaces if desired. In practice, an electrical current is caused to flow from one thickened coating portion 16 to the opposed thickened coating portion 16 across film 14. The electricity passing through layer 14 causes it to be heated thereby heating sheet 12 to melt any ice formed thereon. Any suitable source of electric current can be used to heat the heating element 14 of my invention. However, I have found that a 115 volt alternating current works very well. The voltage of the current necessary to develop the desired amount of heat is dictated by the thickness of coating 14, the type of electrically conductive material, and the distance between thickened coating portions 16 which, together, determine the resistance of the heating element. I have found that alternating current is most desirable since high voltage A.C. is generally available. However, direct current can be used if desired. The amount of electrical energy required to adequately perform the de-icing function is normally in the range of 2 to 3 watts per square inch of heating unit area. The de-icing apparatus 10 of my invention when mounted on the surface of an aircraft or the like, is adapted in use to provide sufficient heat to melt any ice formed thereon, and if mounted on a windshield or window to provide relatively unobstructed, undistorted vision through the windshield or window, and melt ice or prevent ice from forming thereon.

Figure 2:
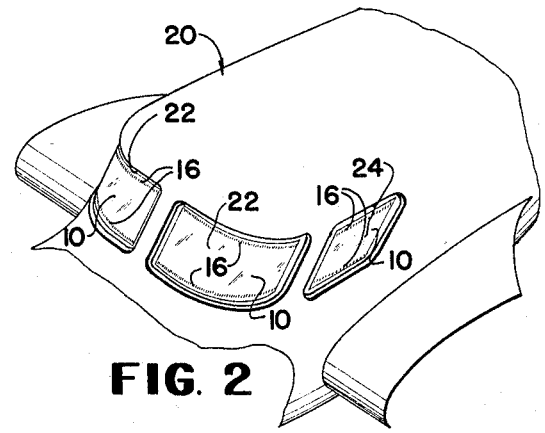
FIG. 2 is a perspective view of a portion of an aircraft illustrating the de-icing apparatus of my invention installed on the windshield and windows thereof.

In FIG. 2 is shown an aircraft 20 having my de-icing apparatus 10 installed on the windshields 22 and side windows 24. Note that the thickened edge portions 16 are disposed along the edges of the windshield 22 and windows 24 to thereby provide a minimum of visual obstruction. The de-icing sheets 10 are directly secured to the windshield by a suitable transparent adhesive in the manner set forth hereinafter.

Figure 4:
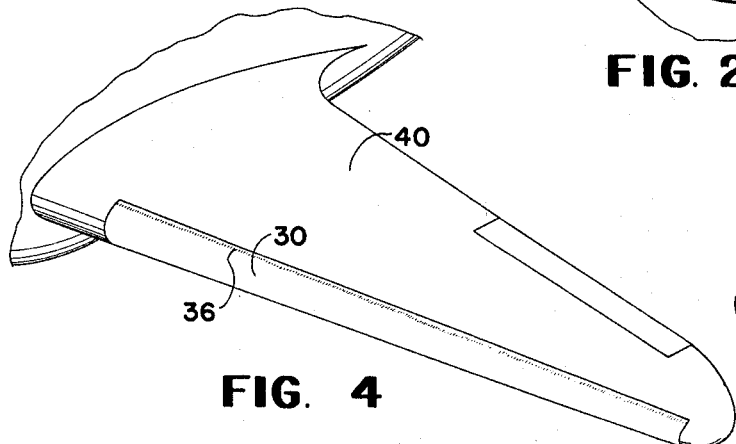
FIG. 4 is a perspective view of the wing of an aircraft illustrating the de-icing apparatus of my invention installed thereon.
Figure 3:
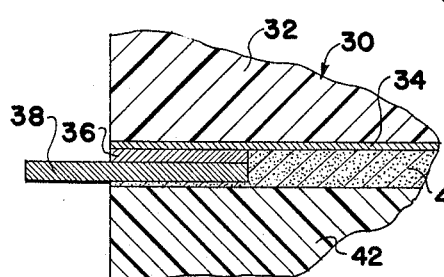
FIG. 3 is an enlarged fragmentary cross sectional view of another de-icing embodiment of my invention.

In FIG. 3 is shown a second embodiment 30 of my de-icing apparatus which is particularly adapted to be mounted on an airfoil surface of the like of an aircraft that is made of electrically conductive material. De-icing apparatus 30 has a first thin backing sheet of plastic 32 which is similar in construction and choice of materials as sheet 12 of embodiment 10. A layer or film 34 of electrically conductive material is disposed on one side of sheet 32. Film or layer 34 can be constructed in the same manner of the same material as layer 14 in embodiment 10 of my apparatus. However, in embodiment 30, the film 34 can be considerably thicker since the optical characteristics, that is, transparency, is not a prime consideration. The film or layer 34 is preferably deposited on sheet 32 by vapor plating in a vacuum. Relatively thick elongated strips 36 of metal or other electrically conductive material are disposed on opposite side portions of the plastic sheet 32 overlying and in electrical contact with the layer or film 34. Terminal means 38 are connected in electrical contact with strips 36. Strips 36 can be of any suitable construction, as for example, thickened coating portions applied by additional vapor plating in a vacuum, or they can be metal strips otherwise secured to the coating 34. Terminal 38 can be of any suitable type of construction, as for example, a strip of metal foil secured in electrical contact with strip 36. If desired, strip 36 and terminal 38 can be a single unitary element made of any suitable electrically-conductive material. A layer of adhesive 40 is used to secure sheet 32 to a second sheet 42. Sheet 42 can be made of any suitable type of material, which materials were discussed in relation to sheets 32 and 12. A suitable source of electrical current is operatively connected to spaced terminals 38 of de-icing apparatus 30 to pass a current through film or layer 34 to thus generate heat. The heating element, consisting of sheets 32 and 42, having an electrically conductive layer 34, terminals 38, and strips 36, as a unit, is, in practice, adhered to the airfoil surface of an aircraft. In FIG. 4 is shown a typical installation on an aircraft wing 40 wherein de-icing apparatus 30 is affixed to the leading edge of wing 40.

Figure 5:
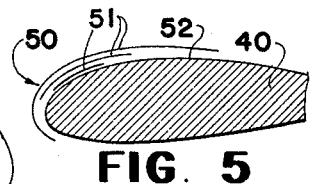
FIG. 5 is a fragmentary cross sectional exploded view illustrating still another de-icing embodiment of my invention.

In FIG. 5 is shown still another de-icing embodiment of my invention adapted to provide a thermal-gradient. The de-icing apparatus 50 is a heating element comprised of a plurality of overlying sheets of varying sizes. Each of the overlying sheets is a single heating element 51 similar in construction to the embodiment 10 shown in FIG. 1. Each of the heating elements 51 has a thin metal coating and electrical terminals in contact with the coating adapted to pass in electrical current therethrough. The sheets 51, shown in exploded relation in FIG. 5, are adhered together and to the airfoil surface with a thin layer of weather-resistant adhesive. Prior to the sheets 51 being adhered to the airfoil wing 40, a thin insulating layer 52 is preferably adhered to the wing surface if the wing with a suitable weather-resistant adhesive. The heating elements 51, usually of different sizes to obtain the desired gradient, are then successively adhered to the wing with a suitable weather-resistance adhesive. The terminals of the respective heating elements 51 are connected to a suitable source of electrical current. As is believed evident from the drawing of FIG. 5, the portion of de-icing apparatus 50 having the greatest number of plies or layers of heating elements 51 will generate more heat. In practice, the area where there is the greatest likelihood that ice will form has the greater number of plies of heating elements 51.

Another embodiment is one wherein the vacuum deposition or "plating" is performed repeatedly through masks of various desired configurations to build up thicker or thinner areas of metal film to provide a varying thermal gradient. The thinner areas produce more heat.

In FIG. 6 of the drawings is shown still another embodiment 60 of my de-icing apparatus particularly adapted for use on aircraft windshields. De-icing apparatus 60 has an electrical resistance heating element 62 having a thin transparent backing plastic sheet 64 of a suitable thickness preferably in the range of 1 to 10 mils, most preferably 2 to 3 mils, and a series of closely spaced parallel vacuum deposited metal conductors 66 on the sheet 64. The conductors 66 are of metal or other electrically-conductive material similar to the film layers 14 and 34 of embodiments 10 and 30. In this embodiment, however, the conductors 66 can be somewhat thicker than the layers 14 and 34. The spacing and thickness of the conductors 66 are such that they will not unduly interfere with the optical characteristics of the heating element 62. Since the thickness of the conductors 66 is greater than the film or layers 14 and 34 of embodiments 10 and 30, the electrical resistance is decreased allowing the use of a current source of a lower voltage. Since the conductors 66 are very fine, they do not appreciably affect the visibility therethrough. Relatively thick strips of metal coating 68 are deposited on the side surface portions of plastic sheet 64 and are in electrical contact with the series of metal conductors 66. Electrical terminals 70 are provided which are in electrical contact with the relatively thick coating strips 68. A thin layer of adhesive secures the heating element 62 to the exterior surface of a windshield or a window of an aircraft with the series of conductors 66 positioned between the exterior surface of the windshield and the plastic sheet 64. A suitable source of current 72 is operatively connected to terminals 70 of heating element 62. In use, the de-icing apparatus is constructed and adapted to provide relatively unobstructed, undistorted vision through the windshield and melt ice and prevent icing from forming thereon. It is understood that a layer of fine spaced conductors can be substituted for film 14 and 34 in embodiments 10 and 30 respectively, if desired.

The method of my invention for producing an electrical resistance de-icing apparatus for an aircraft involves applying a very thin uniform coating of electrically conductive metal on a flexible transparent sheet. The application of the thin coating of electrically conductive material is conveniently accomplished by introducing the sheet into a vacuum chamber, heating and evaporating the electrically conductive material, and causing the evaporated material to deposit on one side of the sheet to form a coating having a thickness which will allow approximately 70% to 90%, most preferably about 85%, of transmission of light therethrough. The thickness of the coating applied can be conveniently tested with a photo-electric cell or other suitable apparatus. Relatively thick, elongated coating layers are disposed on the opposite edges of the sheet by blanking off the center portion of the sheet, introducing the blank sheet into a vacuum chamber, heating and evaporating an electrically conductive metal, causing the evaporated material to deposit on the unblank portions of the sheet to a suitable thickness. The relatively thick layers have a thickness such that they present a relatively small or negligible resistance to the electrical current which will ultimately be passed across the thin film. Electrical terminals are then attached to each relatively thick coating layer. A thin uniform coating of suitable adhesive, most preferably an epoxy adhesive, is applied to the sheet on the plated side thereof and the entire assembly placed on and adhered to the exterior of a windshield or window of an aircraft with the coating portion therebetween. The adhesive used should be water and weather-resistant since the de-icing means will be exposed to weather extremes. The thickness of the adhesive can be any suitable thickness but preferably is in the range of .001 to .010 inch, and most preferably, in the range of .002 to .003 inch. In general, the thinner the layer, the less likely it is to cause optical distortion. The terminals are connected to a source of electricity, most preferably a 115 volt alternating current to enable selective electrical flow of current through the thin electrically conductive coating.

In the embodiment shown in FIG. 6, the series of fine parallel conductors 66 can conveniently be formed by blanking off portions of the sheet with a blanking sheet or element, leaving the portions defining the thin series of conductors, introducing the sheet into a vacuum chamber, evaporating an electrically conductive material and causing the evaporated material to deposit on the sheet and blanking sheet. After the sheet is removed from the chamber, the blanking sheet can be conveniently removed leaving a series of fine conductors 66 disposed on the sheet 64.

While I have described and illustrated preferred embodiments of my invention, it is understood that the de-icing apparatus and combinations thereof, and the method of making same as disclosed may be made and produced in other forms than described or suggested without departing from the spirit of my invention.

I claim:

An unobstructed, optically distortion-free electrical resistance de-icing means for a windshield of an aircraft comprising, a thin, transparent plastic sheet of polytetrafluoroethylene having a uniform thickness in the range of 2 to 3 mils, a thin, uniform vacuum deposited transparent coating of gold on said plastic sheet of a thickness adapted to allow approximately 85 percent transmission of light therethrough, said de-icing means adapted in use to be adhered to the windshield of an aircraft and, when operably connected to a source of electrical current, adapted to melt ice and prevent formation of same on the windshield.

References Cited by the Examiner

UNITED STATES PATENTS

| 2,557,983 | 6/1951 | Linder | 219—543 |
| 2,569,773 | 10/1951 | Orr | 219—543 |
| 2,640,904 | 6/1953 | Gaiser | 219—543 X |
| 2,648,754 | 8/1953 | Lytte | 219—541 |
| 2,676,117 | 4/1954 | Colbert et al. | 219—543 X |
| 2,693,023 | 11/1954 | Kerridge et al. | 29—155.7 |
| 2,710,900 | 6/1955 | Linder | 219—543 |
| 2,725,319 | 11/1955 | Tarnopol | 219—543 X |
| 2,762,897 | 9/1956 | Vroomon et al. | 219—480 |
| 2,827,536 | 3/1958 | Moore et al. | 29—155.7 |

(Other references on following page)

UNITED STATES PATENTS

| | | | |
|---|---|---|---|
| 2,828,236 | 3/1958 | West | 161—186 X |
| 2,878,357 | 3/1959 | Thomson et al. | 219—543 |
| 2,882,377 | 4/1959 | Rinehart | 219—543 X |
| 2,900,290 | 8/1959 | Bethze | 161—186 X |
| 2,954,454 | 9/1960 | Gaiser | 219—543 X |
| 2,970,077 | 1/1961 | Groves | 161—186 X |
| 3,020,376 | 2/1962 | Hofmann et al. | 219—543 X |
| 3,107,197 | 10/1963 | Stein | 161—189 |
| 3,108,170 | 10/1963 | Murphy | 219—543 X |
| 3,142,585 | 7/1964 | Katchman | 117—217 X |
| 3,170,833 | 2/1965 | Noyes | 161—186 |
| 3,180,781 | 4/1965 | Ryan et al. | 219—543 X |

RICHARD M. WOOD, *Primary Examiner.*

ANTHONY BARTIS, *Examiner.*

V. Y. MAYEWSKY, *Assistant Examiner.*